Sept. 22, 1964  C. D. DRANSFIELD  3,149,902
VARIABLE CONTACT RECORDING
Filed Sept. 25, 1961  2 Sheets-Sheet 1
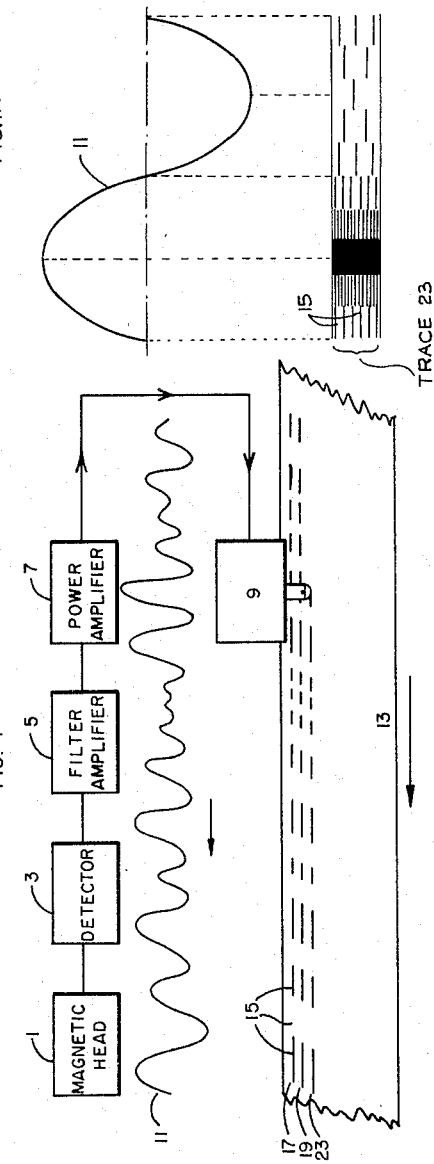
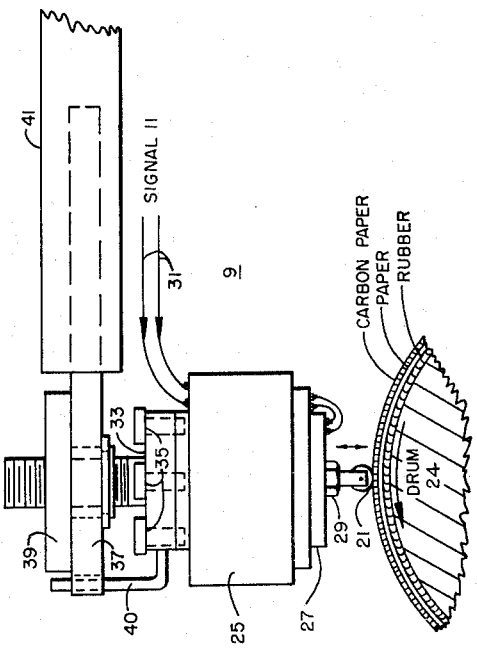
INVENTOR.
Clifford D. Dransfield
ATTORNEY Sept. 22, 1964　　　C. D. DRANSFIELD　　　3,149,902
VARIABLE CONTACT RECORDING
Filed Sept. 25, 1961　　　　　　　　　　　　　2 Sheets-Sheet 2

INVENTOR.
Clifford D. Dransfield
BY Norbert E. Birch
ATTORNEY

ATTEST
Charles F. Steininger

United States Patent Office 3,149,902
Patented Sept. 22, 1964

3,149,902
VARIABLE CONTACT RECORDING
Clifford D. Dransfield, Dallas, Tex., assignor to The Atlantic Refining Company, Philadelphia, Pa., a corporation of Pennsylvania
Filed Sept. 25, 1961, Ser. No. 140,497
2 Claims. (Cl. 346—105)

This invention relates to an improved and simplified system for recording electrical signals in variable density form. More specifically, the invention relates to an inexpensive, variable density recording system highly suited, but not limited, to use as a monitor recorder on a seismic field recording system.

In the past, various types of recording systems have been used to provide immediately visible monitor records of magnetic, photographic, etc., seismic recordings. Probably, the most common seismic monitoring units today use an ink pen recording system. However, even this ink recording system possesses several characteristics that are not altogether suitable for seismic monitoring purposes, or for that matter, most recording purposes. As in most wet writing recording systems, ink recorders are troubled with problems of clogging, record smear, etc. These problems are particularly serious in recording systems that are subjected to short but frequent periods of recording, such as in seismic operations, certain telemetering operations, etc. In these operations, even temporary clogging can be particularly troublesome because critical information usually appears at the early part of each recording cycle and if the system is not responsive immediately the information is not properly recorded.

Ink spatter, record smear, etc., caused by pen or machine vibration, operator contact, excess wind, etc., are additional disadvantages peculiar to wet recording and particularly to ink recording.

The above-recited disadvantages are compounded by severe operating conditions that seismic recording is frequently subjected to. Operations conducted in hot, dry areas, such as the southwestern portion of the United States, the Sahara Desert, portions of Australia, etc., speed up ink evaporation thus increasing the problem of pen clogging. Wind and dust also found in these areas produce record smear as well as aggravate the clogging problem. Of course, recording operations conducted under other climatic conditions produce recording problems but usually not as severe as the problems discussed above.

Accordingly, the main object of this invention is to provide a dependable, dry writing recorder capable of producing an immediately visible record.

Another object of this invention is to provide a polarity-sensitive, variable density recorder.

Another object of this invention is to provide an economical, rugged, dependable variable density recorder.

Another object of this invention is to provide a variable density recorder with the above characteristics that can operate satisfactorily under all types of climatic conditions.

Other objects and advantages of this invention will become apparent from the following description taken in connection with the accompanying drawings.

FIGURE 1 is a block diagram showing a typical use of the recorder.

FIGURE 1A is a large scale representation of a recorded trace segment.

FIGURE 2 discloses the preferred embodiment of the recorder.

Figure 3:
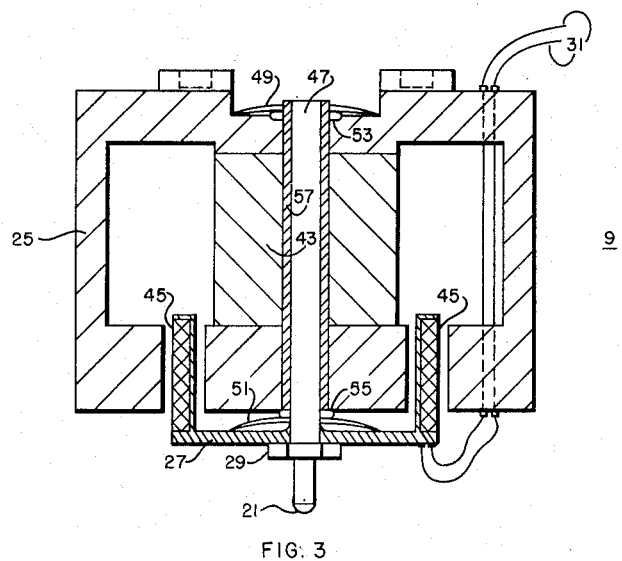

FIGURE 3 shows a detailed drawing of the preferred embodiment.

Figure 4C:
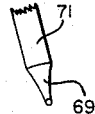
Figure 4B:
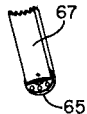
Figure 4A:
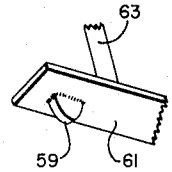

FIGURES 4A through 4C show three types of recording elements that may be used with the recorder.

Briefly, the invention contemplates a variable intensity recording system adapted to mark a pressure-sensitive medium according to a predetermined code. The code requires that one polarity of a signal be represented by increasing pressure on the recording medium above a predetermined zero signal level and that the other polarity be represented by decreasing the pressure below this level. The amplitude of each swing or half cycle is represented by the amount of change from this predetermined zero signal level. The zero signal level can be modified to produce the desired trace tone or color by adjusting the recording element to ride on the pressure-sensitive medium with a selected pressure. After this adjustment is made, one polarity of each cycle is represented by a portion of the trace darker than the zero signal point and the opposite polarity is represented by a portion lighter than the zero signal point. The amplitude of each swing is represented by its tone or variation from the zero signal intensity. When a plurality of these traces are recorded in side-by-side relationship, the over-all effect is to produce a variable intensity recording in which significant reflections stand out and aid the record interpreter.

Refer now to FIGURE 1 showing one possible use of the recorder. Magnetic head 1, detector 3, filter amplifier 5 and power amplifier 7 are not part of the invention but are used to show one combination of components that can be utilized in conjunction with the invention, recorder 9, to make a variable density record. The type of signal received or detected and the source from which it comes are not important as long as the signal presented to recorder 9 is of amplitudes sufficient to operate the recording system and contain frequencies below the resonant frequency of the recorder. In this case, the system is designed to record seismic signals in the 1 to 300 c.p.s. frequency range. However, the system could be constructed to operate in other frequency ranges by one skilled in the art. For purposes of illustration, an exaggerated seismic signal 11 is shown being fed into recorder 9. The portion of the signal extending from recorder 9 to the magnetic head has been recorded on record 13 in form of variable intensity marks 15. Traces 17 and 19 have been previously recorded on record 13 and are shown in a manner to help illustrate the operation of the recorder as well as the variable intensity effect of the record. Of course, actual carbon paper reproduction of signal 11 cannot be illustrated to show all its detail; however, since carbon reproduction is well known it is felt that the use of marks 15 in conjunction with the following explanation will afford proper appreciation of the invention. Recording element 21, FIGURE 2, impresses carbon paper against the record paper to produce trace 23, containing marks 15, FIGURE 1. However, marks 15 are not segmented lines as shown in FIGURE 1 but actually appear as carbon paper reproduction of a continuous, pressure varying impression of stylus 21, FIGURE 2. Depending on the direction of the winding in recorder 9, the positive or negative swing of each cycle in 11 is recorded as the darker portion of trace 23 shown as being recorded in FIGURE 1. The amplitude of each swing in 11 determines the amount of pressure variation or recording stylus vertical movement and the resulting tone (degree of darkness or lightness) of recorded trace 23. FIGURE 1A shows tone variation. As is shown in exaggerated form on record 13, FIGURE 1, frequency variations are indicated by the apparent lengths of marks 15. In other words, the lower the frequency the longer 21 applies force to the record corresponding to a given polarity. For purposes of illustration, contrasts in mark lengths have been emphasized. Although it is most difficult to present a drawing of pressure varying traces made by the invention, FIGURE 1A shows a blow-up of a portion of trace 23 representing a portion of signal 11. This figure illustrates in a graphical manner how the density of marks 15 vary in accordance with signal polarity and amplitude.

Refer now to FIGURE 2, which shows a schematic diagram of the preferred recorder 9. Recorder 9 is shown in conjunction with record supporting medium which in this case is a recording drum 24. Mounted on the surface of the drum and under marking element 21 are carbon paper recording paper and rubber in the order shown. Although carbon is the preferred material, other similar type marking material can be substituted for the carbon. The type of recording paper is not important as long as it is of a color that contrasts with the marking produced by the carbon or other type material overlying the paper. It has been found desirable to utilize a rubber matting or other shock absorbing material under the paper to cushion the force applied by marking stylus 21. By providing an undercushion, additional contrast is obtained on the upward movement of 21; that is, more contrast can be developed from the zero signal level to the lighter shade recordings. The preferred shock absorbing material is a sheet of dental dam located under the paper. Of course, record supporting medium 24 is not limited to a recording drum and can be any suitable type moving record support. The remainder of recorder 9 includes space 25, coil base 27, mounting nut 29 that secures marking element 21 to coil base 27 and input terminals 31 which are shown receiving signal 11. Case 25 is held in its proper recording attitude over drum 24 by bolt 33 whose head is secured to the case by screws 35. The threaded shaft of bolt 35 extends above case 25 through an aperture in supporting plate 37 and is secured by nut 39. By rotating nut 39, the vertical position of recording element 21 can be adjusted. Guide pin 40 attached to bolt 33 projects through slotted support plate 37 to prevent rotation of bolt 33 and maintain recording element 21 in proper alignment. Support plate 37 is shown extending into the computer frame 41.

FIGURE 3 discloses a cross section of recorder 9. Case 25 is shown housing magnet 43 and coil 45 mounted on coil base 27. Coil form 27 is secured to rod 47 by nut 29 which also secures recording element 21 to rod 47. Diaphragm type springs 49 and 51 in conjunction with gaskets 53 and 55 aid in suspending recording element 21 and rod 47 in the proper zero signal vertical position as well as position coil 45 in its proper zero signal position with respect to housing 25. Bushing 57 surrounds rod 47 as shown. Inputs 31 are shown extending through case 25 to coil 45.

Various materials are available to construct the preferred embodiment of the recorder as shown in FIGURE 3. However, experience has shown that particular materials are especially desirable for the individual components. Therefore, case 25 is made from stainless steel, magnetic type 416, while magnet 43 is an Alnico V type permanent magnet. Coil support 27 is made from molded nylon, while the circular curved arm springs 49 and 51 are photo-etched beryllium copper alloy. O-rings 53 and 55 are made from neoprene and rod 47 can be either copper or nylon. Although magnet 43 can be positioned around rod 47 and bushing 57 with its north or south pole adjacent coil 45, for purposes of explanation, the operation of the device will be described with the north pole adjacent coil 45. As is obvious from FIGURE 3, magnet 43 sets up magnetic lines of force circulating from the north pole to the south pole through the various segments of case 25 and coil 45 as shown. As is obvious to one skilled in the art, the majority of these lines of force are contained in the stainless steel case since the reluctance offered by stainless steel is lower than that of the surrounding air.

In operation, recorder 9, FIGURE 3, is connected to a receiving system, such as shown in FIGURE 1, or any other suitable type receiving system wherein signal 11 is fed to inputs 31, FIGURE 3. Depending upon the direction of the windings in coil 45, the polarity of the initially received signal will create lines of flux around the coil 45 in a given direction causing the new field to react in conjunction with the permanent magnetic field and cause coil 45 to move up or down until the force created by the signal equals the tension of springs 49 and 51. Assuming that the direction of coil windings 45 cause a positive going signal to drive the recorder element 21 downward, a dark mark 15, FIGURE 1, is recorded on record 13. As pointed out heretofore, the amplitude of the signal determines the strength of the magnetic field in coil 45 and the resulting pressure 21 applies to record 13. The larger the amplitude, the darker the mark 15. Conversely, when the negative swing of signal 11 reaches coil 45, the direction of the magnetic field is reversed causing coil 45 and recording stylus 21 to reverse its direction and move upward. As 21 moves up from its zero signal position on record 13, trace 23 becomes lighter and the amplitude of the negative swing of the signal is recorded by its degree of variation from the pre-adjusted zero signal pressure level. As was described above, this zero signal adjustment is made prior to operation by positioning nut 39, FIGURE 2, so that stylus 21 applies sufficient pressure to carbon on drum 24 to produce the desired shade of gray on the underlying paper.

FIGURES 4A through 4C show three types of recording styli that have been found satisfactory in this type of operation. Of course, other devices may be utilized. Shoe 59, FIGURE 4A, attached to plate 61 which in turn is secured to rod 63 can be substituted for 21 in FIGURE 3. A satisfactory width for shoe 59 is one millimeter. A small ball-bearing mounted rotating wheel 65, FIGURE 4B, secured to rod 67 can be substituted for 21. This is perhaps the most desirable recording element, in most cases, since the wheel 65 rotates with the movement of the recording paper, thus reducing drag and interference with the recording process. A ballpoint pen 69, FIGURE 4C, in which the ink supply has been removed is also a satisfactory replacement for 21. Of course, it is desirable to reduce the length of shank 71 from the normal length of a ballpoint pen. The rotating property of the ball reduces drag as described with wheel 65. However, in most cases, it is found that the small diameter of the ballpoint produces an individual mark which is less desirable than the larger diameter ball-bearing wheel 65.

Although the preferred embodiment of the recorder 9 has been shown and described, it should be understood that the inventive concept can be carried out in various instrumentations. For instance, instead of using the device shown in FIGURE 3, a suitable variation could include a fixed coil and a spring-mounted, movable magnet on which the recording element is fastened. Of course, this instrumentation is less desirable because of the heavier moment of inertia to be overcome and the resulting reduction in responsiveness. From the above, it is clear that other modifications and substitutions obvious to one skilled in the art may be made without departing from the scope of the present invention which is limited only by the appended claims.

I claim:
1. An improved variable density seismic recorder system adapted to present an electrical signal in variable density form comprising
  (a) a recording drum,
  (b) a pressure sensitive record means superimposed on said recording drum and including sheets of
    (1) carbon paper,
    (2) record paper, and
    (3) a shock absorbing material adapted to in- crease contrast of signals recorded in variable density form, and
(c) a recording means including
  (1) a magnet containing at least one indentation,
  (2) a coil means having an input circuit adapted to receive the electrical signal and moveably mounted within said indentation, said coil means adapted to move into and away from said magnet according to direction of flow of current in said coil means, and
  (3) a record stylus connected to said coil means and adapted to continuously contact said pressure sensitive record means.

2. In a recorder system as set forth in claim 1 wherein the record stylus is connected to the coil means and located parallel to the axis of said coil means.

References Cited in the file of this patent
UNITED STATES PATENTS

| | | |
|---|---|---|
| 392,310 | Brewster | Nov. 6, 1888 |
| 1,493,067 | Cool | May 6, 1924 |
| 2,341,652 | Rey | Feb. 15, 1944 |
| 2,504,126 | Howe | Apr. 18, 1950 |
| 2,964,594 | Beckner et al. | Dec. 13, 1960 |